Aug. 4, 1931.  M. J. HUBERT  1,817,690
BAKING PAN
Filed Aug. 28, 1930   3 Sheets-Sheet 1
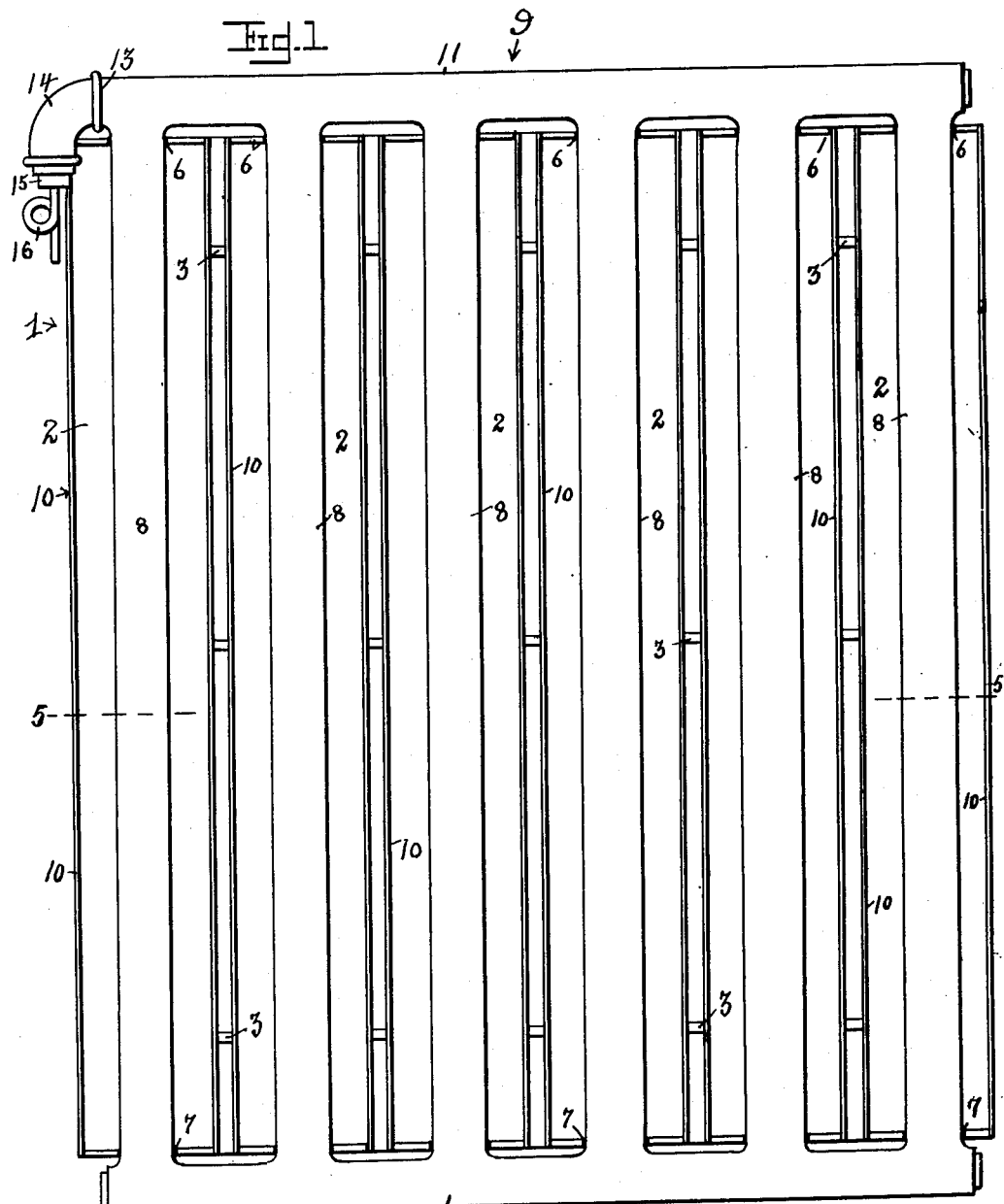
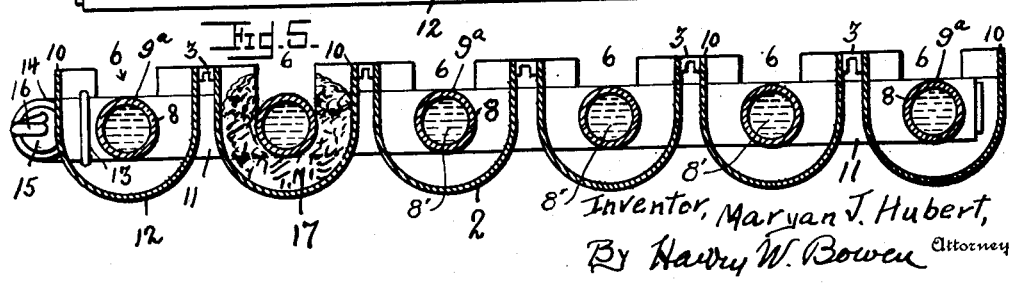
Inventor, Maryan J. Hubert,
By Harry W. Bowen  Attorney Aug. 4, 1931.  M. J. HUBERT  1,817,690
BAKING PAN
Filed Aug. 28, 1930  3 Sheets-Sheet 2
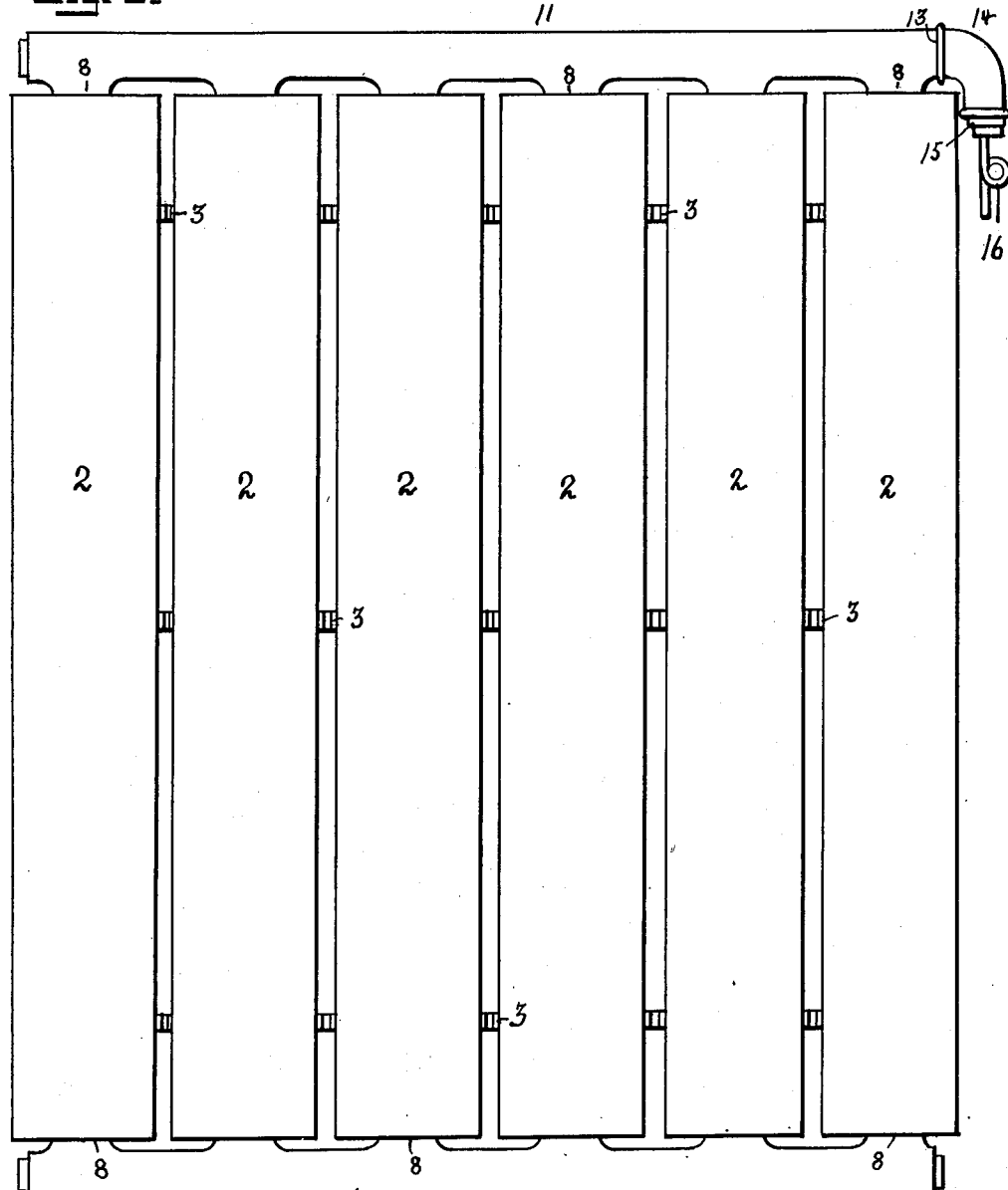
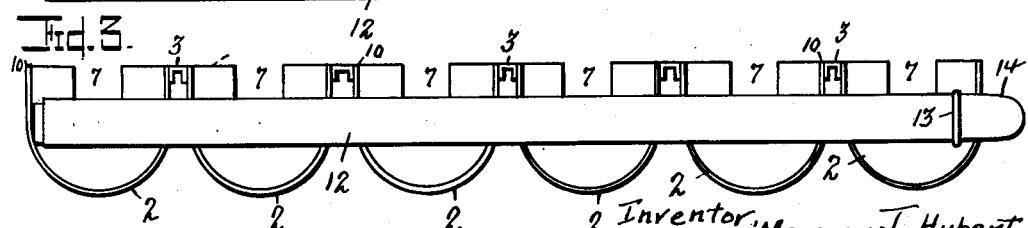

Aug. 4, 1931. M. J. HUBERT 1,817,690
BAKING PAN
Filed Aug. 28, 1930 3 Sheets-Sheet 3
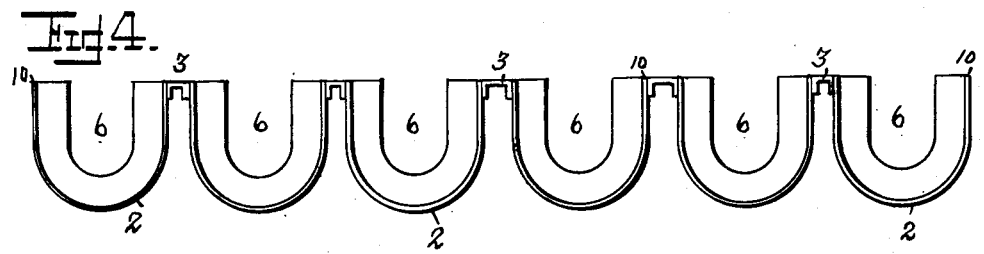
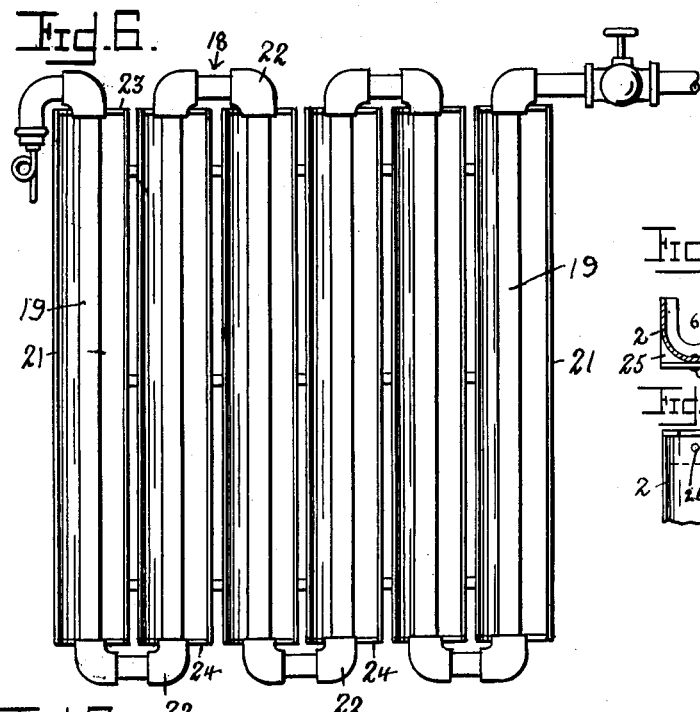
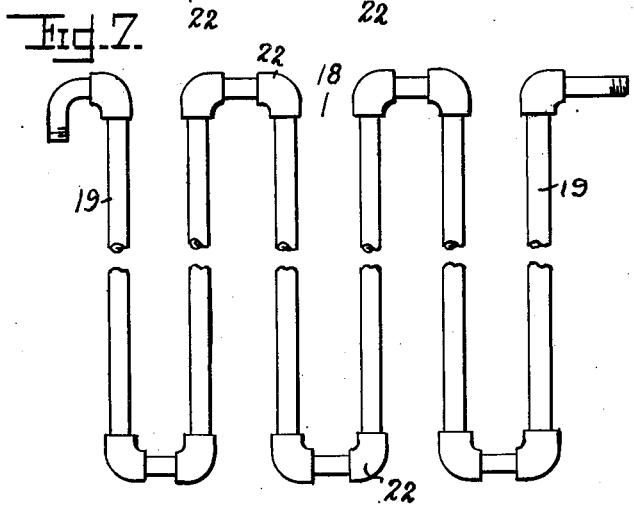

Patented Aug. 4, 1931

1,817,690

UNITED STATES PATENT OFFICE

MARYAN J. HUBERT, OF EASTHAMPTON, MASSACHUSETTS

BAKING PAN

Application filed August 28, 1930. Serial No. 478,457.

This invention relates to improvements in baking, and has for its object to provide a baking pan so constructed that long rolls to be used for Frankfurter sausage sandwiches may be baked already split, or with a longitudinal opening.

Another object of this invention is to provide a baking pan for baking rolls having recesses into which a Frankfurter sausage may be laid.

A further object of the invention is to provide means for baking rolls already split and without crusting the split surface.

With the above and such other objects in view as may herein later appear, I have invented the device illustrated in the accompanying drawings, in which:

Fig. 1 is a top plan view of my improved baking pan;

Fig. 2 is a bottom plan view thereof;

Fig. 3 is an end elevational view;

Fig. 4 is a similar view with a water coil section removed;

Fig. 5 is a section on the line 5—5 of Figure 1;

Fig. 6 is a view similar to Figure 1, of a modification; and

Fig. 7 is a perspective view of the coil used therein.

Figures 8, 9 and 10 are details illustrating a modification in the mold unit supports.

Like reference characters indicate like parts throughout the following specifications and in the several views in the drawings, in which 1 indicates a baking pan consisting of a series of trough-like sections 2 connected to one another by clips 3 or in any other suitable manner. Ends 4 and 5 of the pan are provided with a series of aligning cutouts 6 and 7 to receive the parallel pipes 8 of the water circulating coil 9, which pipes 8 seat well down within the pan sections 2, the upper surfaces 9ᵃ of the pipes 8 being located below the upper edges 10 of said pan sections. Pipes 8 intersect at their opposing ends with transverse pipes 11 and 12, the latter having a threaded opening 13 into which the nipple 14 is threaded, said nipple being closed by a plug 15 having an escape safety valve 16 for the escape of steam from the coil. In using this pan, the dough for finger or Frankfurter rolls is placed in the bottom of each of the pan sections 2, after which the coil 9 is seated upon the pan. The pipes 8 seat upon the dough, which raises partially around said pipes 8, as indicated at 17 in Figure 5. The pipes 8 having hot water 8' therein, prevent crusting of the dough bearing thereagainst, and the pipes form the split in the rolls, when cooked, said split being slightly greater in width than the diameter of the pipes 8 and of a shape to receive a Frankfurter sausage. I preferably make the pan of a size to bake about four dozen rolls, or any suitable number which rolls may be made as individual rolls by spacing the dough apart in pan sections 2 or may be cooked in long strips and cut apart, as preferred. When the pan is taken from the oven and the pipes 8 of the coil 9 are removed from the pan, the baked rolls will remain in the pan since the width of the slit, as stated, is greater than the diameter of the pipes 8. The rolls will then be removed from all of the pans ready for packing after the pipes 8 have been removed.

In Figures 3, 6 and 7, I show a modification in the invention, in which the coil 18 is formed of a single sinuous pipe line 19 the parallel portions 20 of which seat within the pan 21 and the arcuate ends 22 of which seat without the ends 23 and 24 of said pan. Otherwise, the device is the same as in Figure 1.

In Figures 8, 9, and 10, a modification in the construction of the supports for the mold units comprising an L-shaped plate 25, arranged to project by one limb beneath the ends of the members 2 and secured thereto as by rivets 26, and with recesses 6' corresponding to the recesses 6 in the other limb of the member 25. It should be stated that the length of the pipes 8, where they join the pipe 11 and 12 is such that when they are put in place in the cutouts 6 and 7, they will not be moved longitudinally, whereby the rising of the dough will not be interfered with as any slight disturbance of the dough will cause it to fall, as readily understood.

The finished article, when baked, will be formed with a toasted surface on its outer surface, which is in contact with the inner surface of the pan. The surface of the dough which is in contact with the pipes 8 will not be toasted or crusted, but formed with very thin, if any crust.

It should also be noted that the longitudinal openings 2' permit the flow of the heated air upward between the pans, thus providing an evenly heated surface along the entire surface of the dough 17.

What I claim is:

1. In a baking pan, means whereby rolls may be baked already split, said means consisting of a coil, said coil being a water coil, said pan being formed in sections, a portion of said coil seating within each of said sections.

2. In a baking pan, means whereby rolls may be baked already split, said means consisting of a coil, said coil being a water coil, said pans being formed in sections, a portion of said coil seating within each of said sections, in a manner to allow the dough to shape itself partially around the coil.

3. In a baking pan, means whereby rolls may be baked already split, said means consisting of a coil, said coil being a water coil, said pan being formed in sections, a portion of said coil seating within each of said sections in a manner to allow the dough to shape itself partially around the coil, said pan having its opposing end walls provided with cutouts to receive said coil.

4. In a baking pan, means whereby rolls may be baked already split, said means consisting of a coil, said coil being a water coil, said pan being formed in sections, a portion of said coil seating within each of said sections, in a manner to allow the dough to shape itself partially around the coil, said pan having its opposing end walls provided with cutouts to receive said coil, means provided for supplying water to said coil.

5. In a baking pan, means whereby rolls may be baked already split, said means consisting of a coil, said coil being a water coil, said pan being formed in sections, a portion of said coil seating within each of said sections in a manner to allow the dough to shape itself partially around the coil, said pan having its opposing end walls provided with cutouts to receive said coil, means provided for supplying water to said coil, and means for providing steam escapement from said coil.

6. In a bread baking pan, means adapted to be seated therein around which the bread may form during the baking process, said means consisting of a water pipe, and a continuous coil to which said pipe is connected.

7. In a bread baking pan, means adapted to be seated therein around which the bread may form during the baking process, said means consisting of a water pipe, and a continuous coil to which said pipe is connected, means for steam escapement from said coil.

8. A baking pan consisting of a series of elongated U-shaped members, connected together, and a continuous, sinuously formed pipe having one section thereof seated in each of the U-shaped members.

9. A baking pan consisting of a series of elongated U-shaped members connected together, and a continuous, sinuously formed pipe having one section thereof seated in each of said U-shaped members, and connecting tubes thereof seated outside of the pan.

10. A baking pan consisting of a series of elongated U-shaped members connected together, and a continuous, sinuously formed pipe having one section thereof seated in each of said U-shaped members, and connecting tubes thereof seated outside of the pan, said coils arranged to convey steam to heat the same.

11. A bread baking pan, comprising a series of U-shaped members laterally spaced from each other to allow heated air to pass upward therethrough, a pipe containing water in each U-shaped member, for providing a longitudinal slit in the baked bread.

MARYAN J. HUBERT.